United States Patent

Yang

[11] Patent Number: 5,275,566
[45] Date of Patent: Jan. 4, 1994

[54] COLOR DISTINGUISHING CARD SET

[76] Inventor: Chih-Shun Yang, 9, Section 3, Lin-yun Road, Wu-ku, Taipei Hsien, Taiwan

[21] Appl. No.: 985,601

[22] Filed: Dec. 3, 1992

[51] Int. Cl.⁵ .............................................. G09B 19/00
[52] U.S. Cl. ......................................... 434/98; 434/102
[58] Field of Search ..................................... 434/98, 102

[56] References Cited

U.S. PATENT DOCUMENTS

| | | | |
|---|---|---|---|
| 1,070,891 | 8/1913 | Hochstetter | 434/98 X |
| 1,957,816 | 5/1934 | Braeg | 434/98 |
| 2,203,167 | 6/1940 | Lodwock | 434/98 |
| 3,010,226 | 11/1961 | Kalnins | 434/98 X |
| 3,425,138 | 2/1969 | Balinkin | 434/102 |
| 4,486,023 | 12/1984 | Tomoff | 434/98 X |
| 5,174,758 | 12/1992 | Abramson | 434/98 |

FOREIGN PATENT DOCUMENTS

| | | | |
|---|---|---|---|
| 1218321 | 6/1966 | Fed. Rep. of Germany | 434/98 |
| 2318302 | 11/1973 | Fed. Rep. of Germany | 434/98 |
| 1349444 | 12/1963 | France | 434/98 |

*Primary Examiner*—Gene Mancene
*Assistant Examiner*—L. Thomas
*Attorney, Agent, or Firm*—Bucknam and Archer

[57] ABSTRACT

A simple color distinguishing card set is composed of certain mixed color cards and a primary color arrangement card. Each of these mixed color cards is provided with a primary color spot, a plurality of mixed color spots, and a plurality of transparent spots groups or holes groups. The primary color card is provided with a plurality of primary color congregation areas. A specific mixed color may be easily found by means of packing together some or all of these mixed color cards. Reversely, specific primary colors may be obtained by means of placing the respective mixed color card over the primary color arrangement card.

12 Claims, 3 Drawing Sheets

COLOR DISTINGUISHING CARD SET

The present invention relates to a color distinguishing card set, and more precisely, the present invention relates to a color card set with which a final color generated by mixing certain primary colors may be found out easily without actual engaging mixing procedure, and also, specific primary colors of a mixed color may be obtained by means of a simple operation.

BACKGROUND OF THE INVENTION

It is quite natural to mix certain colors for obtaining another color. Taking simple examples for two color mixing, red color mixing with yellow color, yellow color mixing with blue color, and blue color mixing with red color may result in orange color, green color, and purple color respectively. Taking examples for three color mixing, combining red color, yellow color, and white color will produce light orange color; combining yellow color, blue color and white color will produce light green color, and combining white color, blue color, and red color will produce light purple color. It is not difficult to figure out the resultant color of two or three primary colors which are well known. Nevertheless, it can be understood that it is hard to figure out a specific resulting color merely depending on looking at certain primary colors. Moreover, it is much more difficult to figure out all specific primary colors by means of a known mixed color. In the field of practical applications, works related to fine arts such as painting, sign designing, and etc. are always needed to distinguish colors correctly, and it would be very helpful to do a better job if an easily operated powerful tool is available. Also, children often play games concerning color judgement, and it may become much more fun if a handy guide is accompanied with them.

Presently, there are some prior art color distinguishing tools merely for treating two or three primary colors mixing. But, they are too limited in functions to satisfy the practical needs. The present invention may overcome the disadvantage existing in prior art color distinguishing tools.

SUMMARY OF THE INVENTION

The crux of the color distinguishing card set according to this invention resides in the fact that the card set is provided with certain mixed color cards and a primary color arrangement card. Each mixed color card is composed of a primary color spot, a plurality of mixed color spots, and a plurality of transparent spots groups or hole groups, and the primary color arrangement card contains a plurality of primary color congregation areas. Part or all of these mixed color cards are gathered into a pack, then a specific identical transparent spot group or hole group may align with each other so as to show a specific mixed color displayed on the mixed color spot over the specific transparent spots group or hole group. When the respective mixed color card is placed over the primary color arrangement card, the respective color on each primary color congregation area is seen through each transparent spots group or hole group being all the primary colors of the color on the mixed color spot above each transparent spots group or holes group.

An object of the present invention is to provide a color distinguishing card set which is composed of certain special arranged mixed color cards and a specially arranged primary color card so that operations for finding a specific mixed color and specific primary colors may be easily conducted.

Another object of the invention is to provide a specially arranged color distinguishing card set with which many more colors may be dealt so that it is quite suitable for application in fields related to color recognition.

Another object of the invention is to provide a handy color distinguishing card set which children may use as an excellent color guide.

BRIEF DESCRIPTION OF THE DRAWING

The present invention will be further illustrated, by way of example, with reference to the accompanying drawings in which.

DETAILED DESCRIPTION OF THE PREFERRED EMBODIMENT

Figure 1:
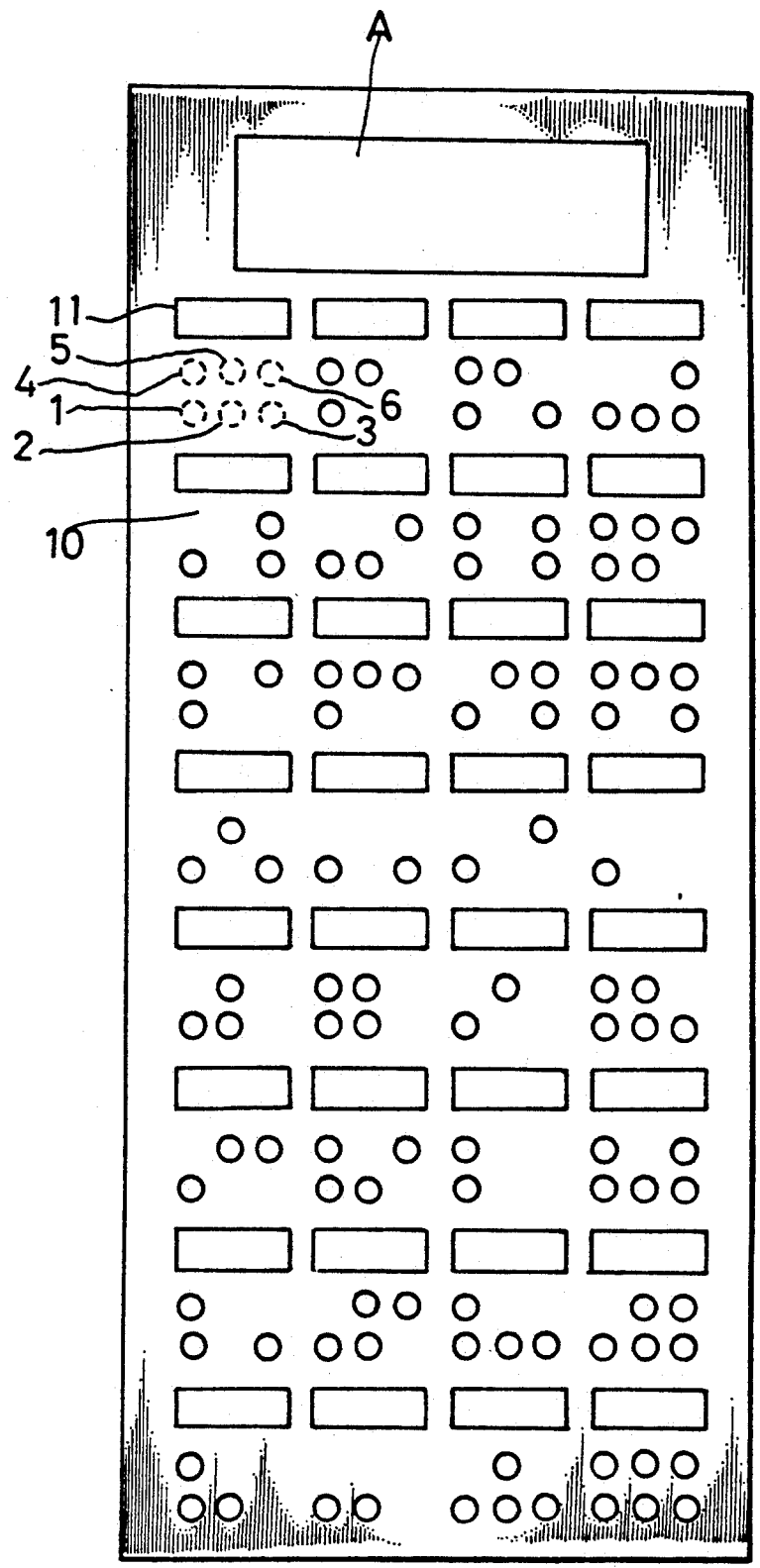
FIG. 1 is a plan view of one of six mixed color cards in the embodiment of a color distinguishing card set for dealing with six primary colors.
Figure 2:
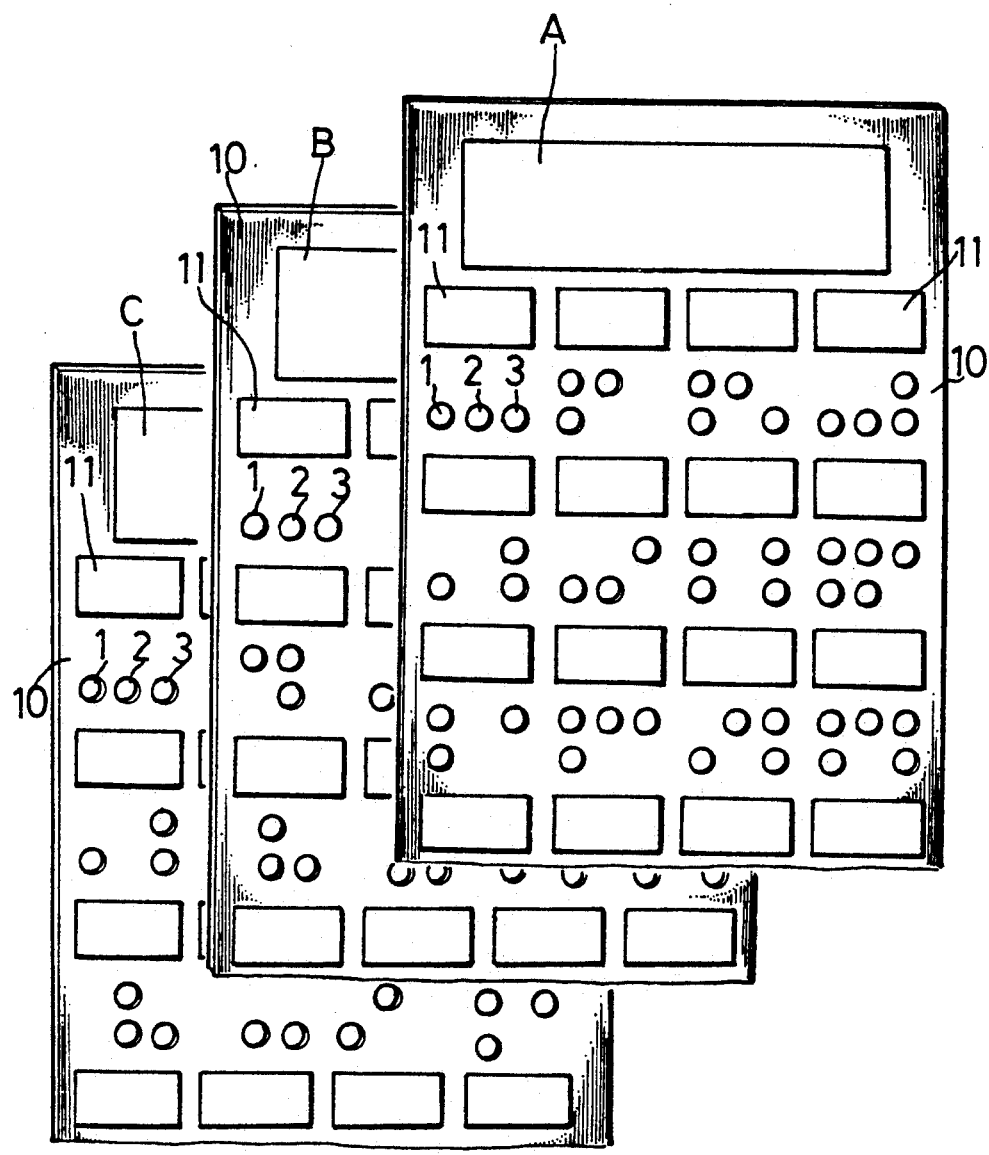
FIG. 2 is a perspective fragmentary view of three of six mixed color cards in the embodiment, showing these three mixed color cards to be packed together for finding a mixed color.

By reference to FIG. 1, one of six mixed color cards contained in a color distinguishing card set for treating six primary colors is shown. The mixed color card is provided with a primary color spot A, a plurality of mixed color spot 11, and a plurality of transparent spot groups or hole groups 10. The primary color spot A is positioned at the top of the mixed color card. These mixed color spots 11 are lined up into rows and columns with distance apart from each other respectively below the primary color spot A. Each mixed color spot has a much smaller area than the primary color spot A. Each of the transparent spots group or holes group 10 is located in the space under each mixed color spot 11 respectively for identifying the color on each mixed color spot 11. The location for setting up each transparent spot groups or hole group basically has six definite places like dash line circles 1, 2, 3, 4, 5, and 6 shown in the upper left region of the mixed color card for building transparent spots or holes. As we can see from the mixed color card, each transparent spots group or holes group is provided with certain transparent spots or holes at certain definite places respectively so that the color on the mixed color spot 11 over each transparent spots group or holes group may be identified and recognized as the mixed color of certain primary colors. For instance, all transparent spot groups or hole groups which have two transparent spots or holes respectively are arranged differently in placing transparent spots or holes, in which two transparent spots or holes show that the color on the mixed color spot above the respective transparent spots group is the mixed colors of two primary colors and two different placed transparent spots or holes indicate the color on the respective mixed color spot obtained by means of mixing two specific primary colors. By the same token, mixed color spots over transparent spots groups or holes groups other than those containing two transparent spots or holes in the mixed color card may be easily identified and recognized. It is noted that there are five different mixed color cards which are similar to the aforesaid mixed color card in this embodiment. Basically, all mixed color cards have the identical dimension, but the color on the respective primary color spot is different and the arrangement of the color on the respective mixed color spot and the arrangement of the respective transparent spot group or hole groups are partly different. With reference to FIG. 2, this is an example showing any three of these six mixed color cards in which are to be packed together to find a mixed color of three specific primary colors displayed on the primary color spots A, B, and C disposed in these three mixed color cards respectively. It can be seen that a respective transparent spots group or holes group which is located under the upper left mixed color spot in each of these three mixed color cards has three transparent spots or holes built at places 1, 2, and 3. Therefore, as long as these three mixed color cards are packed together, only the respective specific transparent spot group or holes group 10 may align with each other and it can be sure that the color displayed on the respective mixed color spot above the respective transparent spots group or holes group is the resulting color mixed by the three primary colors displayed on the primary color spots A, B, and C. Besides the example for finding a mixed color of these three specific primary colors, there are other combinations of any other three mixed color cards for finding different specific mixed color. It also can be understood that a mixed color for any two, four, five, and six primary colors which are offered by the color distinguishing card set for dealing with six primary colors may be obtained easily by means of the same operation way illustrated by the aforesaid example.

Figure 3:
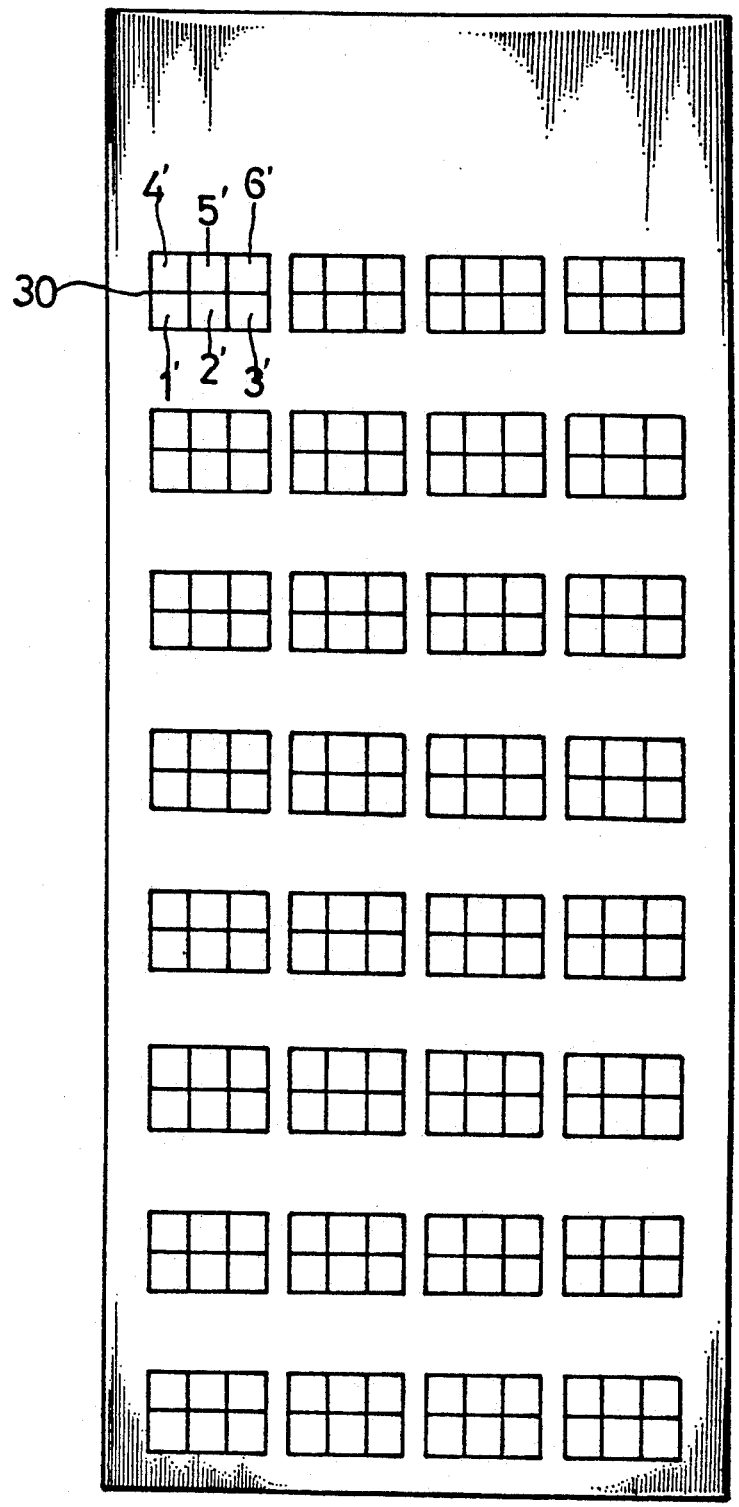
FIG. 3 is plan view of a primary color arrangement card.

FIG. 3 illustrates a primary color arrangement card which is contained in the embodiment of the color distinguishing card set for treating six primary colors. The primary color arrangement card also has the same dimension as each mixed color card and is provided with a plurality of primary color congregation areas 30. These primary color congregation areas 30 are arranged and lined up into rows and columns with adjacent congregation areas spaced a distance apart. Each primary color congregation area 30 is composed of six primary color places 1', 2', 3', 4', 5', and 6' joined with each other and corresponding to each transparent spots group or holes group in the respective mixed color card so that the transparent spots or holes built at the location of each transparent spot group or hole group may align with part of these six primary color places 1', 2', 3', 4', 5', and 6' or all of these six primary color places 1', 2', 3', 4', 5', and 6'. Furthermore, each of these six primary color places 1', 2', 3', 4', 5', and 6' presents one of six specific primary colors offered by the color distinguishing card set, and the respective color on each place 1', 2', 3', 4', 5', and 6' is arranged by means of a special order. In addition, all primary color congregation areas 30 in the primary color arrangement card are identical, that is the colors displayed on places 1', 2', 3', 4', 5', and 6' in all primary color congregation areas 30 are completely same. Therefore, when the respective mixed color card is placed over the primary color arrangement card, some or all six colors on each primary color congregation area 30 may be viewed through all transparent spots or holes of each transparent spots group or holes group 10, and the colors seen are all primary colors of the mixed color on each mixed color spot 11 over each transparent spot group or hole group 10. This is a simple way to find out all the primary colors of a color displayed on each mixed color spot 11.

Through the preceding description of the embodiment, it is apparent that the color distinguishing card set according to the present invention is capable of finding out a specific mixed color of certain primary colors easily, and conversely, specific primary colors of a mixed color also may be obtained without any difficulty. It is worth to mention that although the color distinguishing card set, in the above embodiment offers six primary colors, a color distinguishing card set offering more than six primary colors or less than six primary colors may also be obtained as long as mixed color cards and the primary color arrangement card are appropriately. In addition, it is understandable that the respective transparent spot or hole of each transparent sport group or hole group may be replaced by a square or any other suitable shape instead of the circle shown in FIG. 1 and FIG. 2, and the respective primary color place of each primary color congregation area 30 may also be replaced by a circle or any other suitable shape instead of a square shown in FIG. 3.

I claim:

1. A color distinguishing card set comprising a plurality of mixed color cards, and a primary color arrangement card; wherein each of said plurality of mixed color cards has the same dimension as the primary color arrangement card and is provided with a primary color spot near the top, a plurality of mixed color spots arranged in rows and columns below said primary color spot, and a plurality of transparent spots groups; said primary color arrangement card is provided with a plurality of primary color congregation areas corresponding to said plurality of transparent spots groups respectively.

2. The color distinguishing card set according to claim 1 wherein said plurality of mixed color spots in each of said plurality of mixed color cards are distributed with adjacent mixed color spots spaced at a distance with each other respectively.

3. The color distinguishing card set according to claim 1 wherein each of said plurality of transparent spot groups is located in a space under each of said plurality of mixed color spots with certain specific transparent spots.

4. The color distinguishing card set according to claim 3 wherein said certain specific transparent spots in the respective transparent spots group are located in specific places to identify the color on the respective mixed color spot.

5. The color distinguishing card set according to claim 1 wherein the color displayed on said primary color spot in each of said plurality of mixed color cards is different from each other.

6. The color distinguishing card set according to claim 1 wherein the respective color on the respective mixed color spot in each of said plurality of mixed color cards is the same.

7. The color distinguishing card set according to claim 1 wherein said plurality of primary color congregation areas are lined up into rows and columns with adjacent primary color congregation areas spaced at a distance one from the each other.

8. The color distinguishing card set according to claim 7 wherein the location of each of said plurality of primary color congregation area is arranged to align with the location of the respective transparent spots group when each of said plurality of mixed color cards is placed over said primary color arrangement card.

9. The color distinguishing card set according to claim 4 wherein the number of said certain specific transparent spots in the respective transparent spot group indicates the color on the respective mixed color spot is a mixture of said plurality of primary colors.

10. The color distinguishing card set according to claim 7 wherein each of said plurality of primary color congregation areas is located in a plurality of places joined one with the other and all primary colors in said plurality of mixed color cards are specifically located on said plurality of places.

11. The color distinguishing card set according to claim 10 wherein all primary colors are identically arranged on each of said plurality of primary color congregation areas.

12. A color distinguishing card set comprising a plurality of mixed color cards, and a primary color arrangement card, wherein each of said plurality of mixed color cards has the same dimension as said primary color arrangement card and is provided with a primary color spot near the top, a plurality of mixed color spots arranged in rows and columns below said primary color spot, and a plurality of specific holes located in a space under each of said plurality of mixed color spots, said primary color arrangement card is provided with a plurality of primary color congregation areas corresponding to said plurality of specific holes.

* * * * *